United States Patent [19]
Schmidt

[11] 3,989,992
[45] Nov. 2, 1976

[54] PULSE WIDTH MODULATED CONTROL SYSTEM

[75] Inventor: Robert H. Schmidt, Minnetonka, Minn.

[73] Assignee: Electro-Craft Corporation, Hopkins, Minn.

[22] Filed: Mar. 10, 1975

[21] Appl. No.: 556,653

[52] U.S. Cl. .............................. 318/257; 318/263; 318/341; 307/72; 307/75
[51] Int. Cl.² .......................................... H02P 1/22
[58] Field of Search ............... 318/257, 263, 341; 307/72, 75

[56] References Cited
UNITED STATES PATENTS

| | | | |
|---|---|---|---|
| 3,480,849 | 11/1969 | Thornsen et al. | 318/341 X |
| 3,555,304 | 1/1971 | Magee | 318/341 X |
| 3,783,360 | 1/1974 | Bundy | 318/341 X |
| 3,864,612 | 2/1975 | Whited | 318/341 |

*Primary Examiner*—Gene Z. Rubinson
*Attorney, Agent, or Firm*—Warren A. Sturm

[57] ABSTRACT

A pulse width modulated motor control system in which the power supplies for forward and reverse operation for the motor are provided to supply electric energy at different levels. The control signals for the motor are provided in such a manner that the average energy of unbalanced pulse periods is the same, but the potential level differs by a substantial amount. Energy storage may be provided for in conjunction with the lesser of the two power supplies to assist in a rapid reversal, stop or shaft positioning of the motor.

7 Claims, 6 Drawing Figures

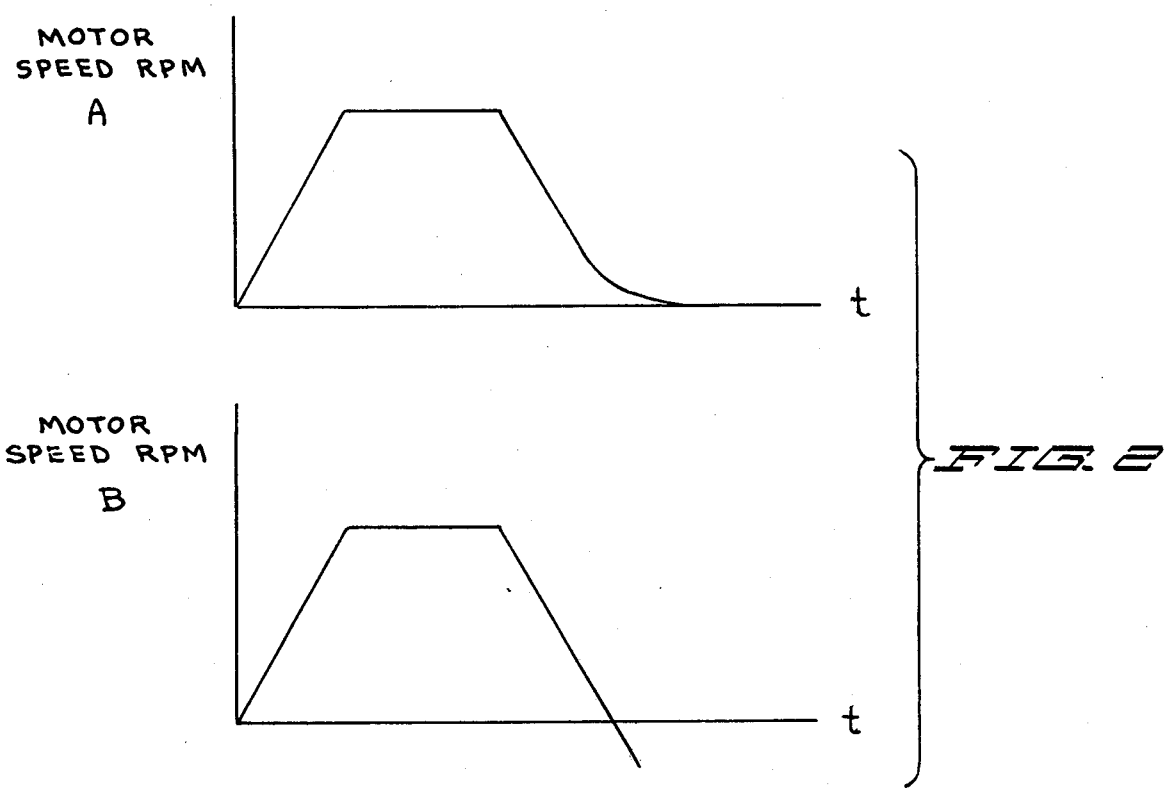
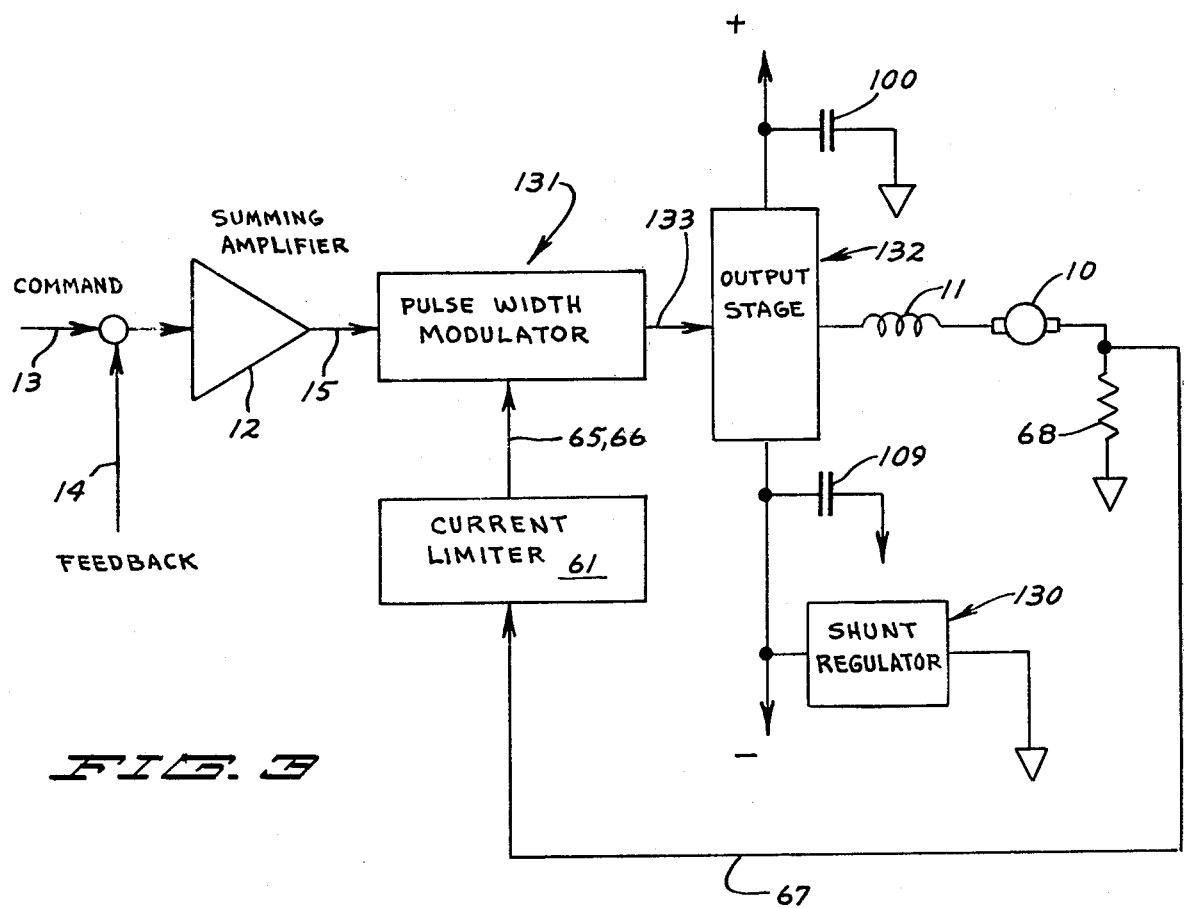

3,989,992

PULSE WIDTH MODULATED CONTROL SYSTEM

BACKGROUND OF THE INVENTION

Many DC servo motor systems require that a motor rotate in only one direction or that it possess capabilities of high speed operation or greater acceleration in one direction than in the other direction. Prior art systems have given rise to pulse width modulated servo systems utilizing bi-directional amplifiers and the like to energize a motor so that energization of the motor is essentially the same for both directions of operation. This leads to unwarranted expenditures of time, energy, and unnecessary expense.

SUMMARY OF THE INVENTION

The present invention utilizes what has been deemed to be an asymmetrical bi-polar system in which different magnitudes of power supplies are utilized for driving a motor in forward and reverse directions and free wheeling or back current is utilized to assist in the operation of the system. Utilizing the principles of my invention, a higher voltage is supplied to the motor for one mode of operation and a lower voltage is supplied to a motor for the other mode of operation so that the system is operable in a high performance characteristic in one direction and a lower performance characteristic in the other direction or mode. By utilizing the free-wheeling current existing in the system when changing from one direction to another, change from one mode or direction to another mode or direction is enhanced.

A fixed frequency variable duty cycle bi-polar pulse width modulated amplifier is utilized in connection with the aforesaid described asymmetrical power supplies.

BRIEF DESCRIPTION OF THE DRAWINGS

FIG. 2 is a family of curves illustrating the operation of my invention;

FIG. 3 is a brief diagrammatic sketch of the system of FIGS. 1A and 1B;

Referring now to FIG. 3 of the drawings, there is shown a motor 10 adapted to be energized from an output stage 132 that is shown connected to a positive and negative source of voltage (not shown), capacitors 100 and 109 are connected to the positive and negative sources of voltage. respectively, and a shunt regulator 130 is further connected to the negative source of voltage. Motor 10 is connected to ground through a resistor 68 and the top end of resistor 68 is connected to a current limiter 61 through conductor 67.

A source of command signal is represented generally by reference character 13 and a feedback source, which may be comprised of conventional velocity or positional feedback apparatus such as a position encoder or a tachometer, is indicated generally by reference character 14. A summing amplifier 12 provides an output to pulse width modulator 131 through conductor 15. The output of pulse width modulator 131 is connected to output stage 132 through conductor 133. FIG. 3 is intended to give an overview to further enhance the understanding of the detailed description of FIGS. 1A and 1B which follows below.

Referring to FIGS. 1A and 1B, output stage 132 is shown as including a plurality of transistors, including principal switching transistors 78 and 90, connected to positive and negative power supplies, respectively. The top half of output stage 132 includes transistor 33 having a base electrode 34, an emitter electrode 36 connected to ground to terminal 60 and a collector electrode 35 connected to the positive voltage supplied through parallel combination of resistors 94, 95, 96, 97 and resistor 98. The junction between resistor 97 and resistor 98 is connected to base electrode 78 on transistor 70. Emitter electrode 73 on transistor 70 is connected to positive power supply through diode 99 and its collector 73 is connected to base electrode 75 on transistor 74. Collector electrode 76 on transistor 74 is connected to emitter electrode 73 on transistor 70 and the emitter electrode 77 on transistor 74 is connected to collector electrode 73 on transistor 70 through resistor 134. Emitter electrode 77 on transistor 74 is also connected to base electrode 79 on switching transistor 78 and to emitter electrode 81 through resistor 135. Collector electrode 80 is connected to the positive power supply and to ground through capacitor 100. Emitter electrode 81 is connected to collector electrode 80 through free-wheeling diode 136.

Figure 1A:
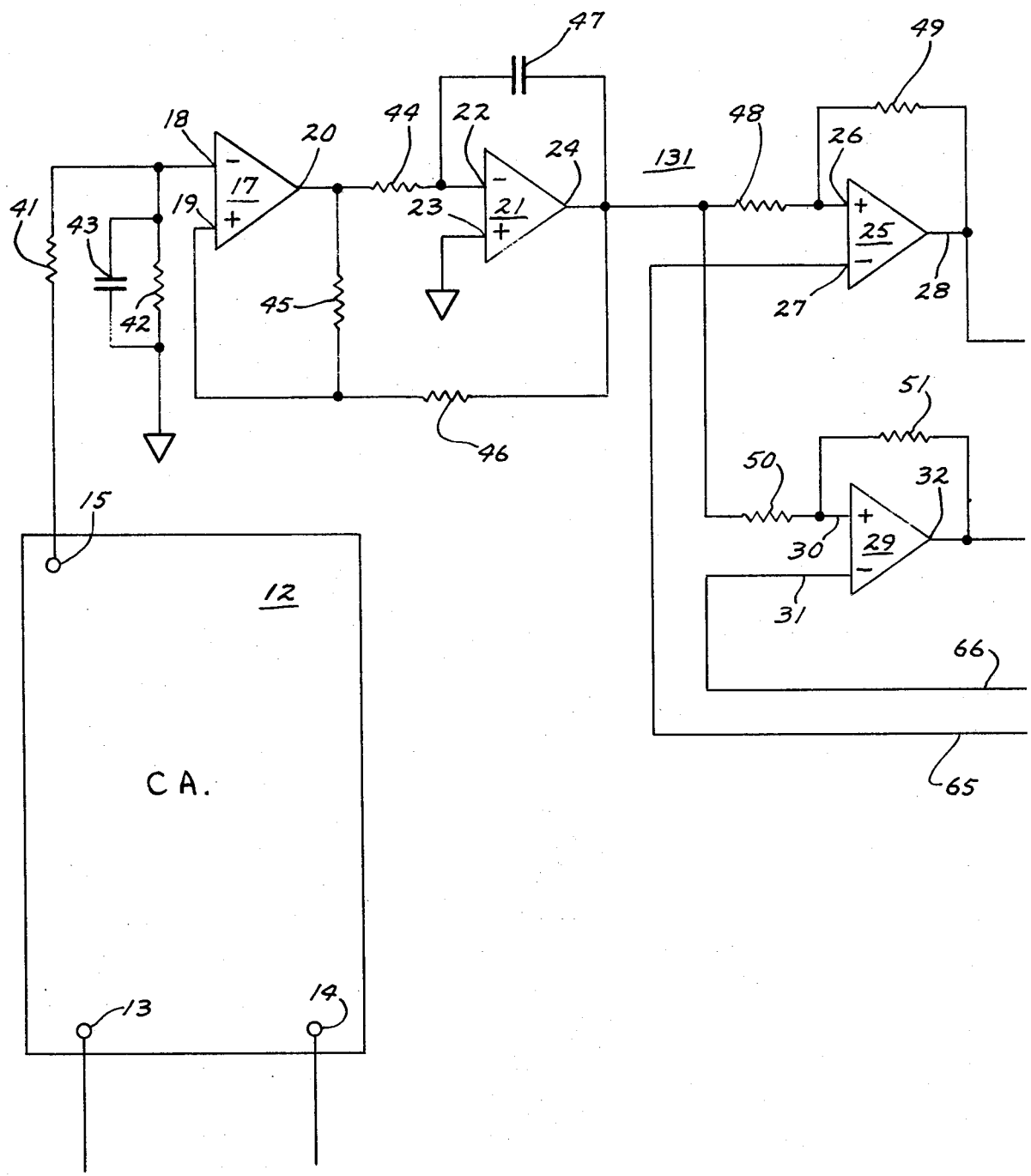
FIGS. 1A and 1B are a composite schematic and diagrammatic drawing of a pulse width modulated control system incorporating the principles of my invention.
Figure 1B:
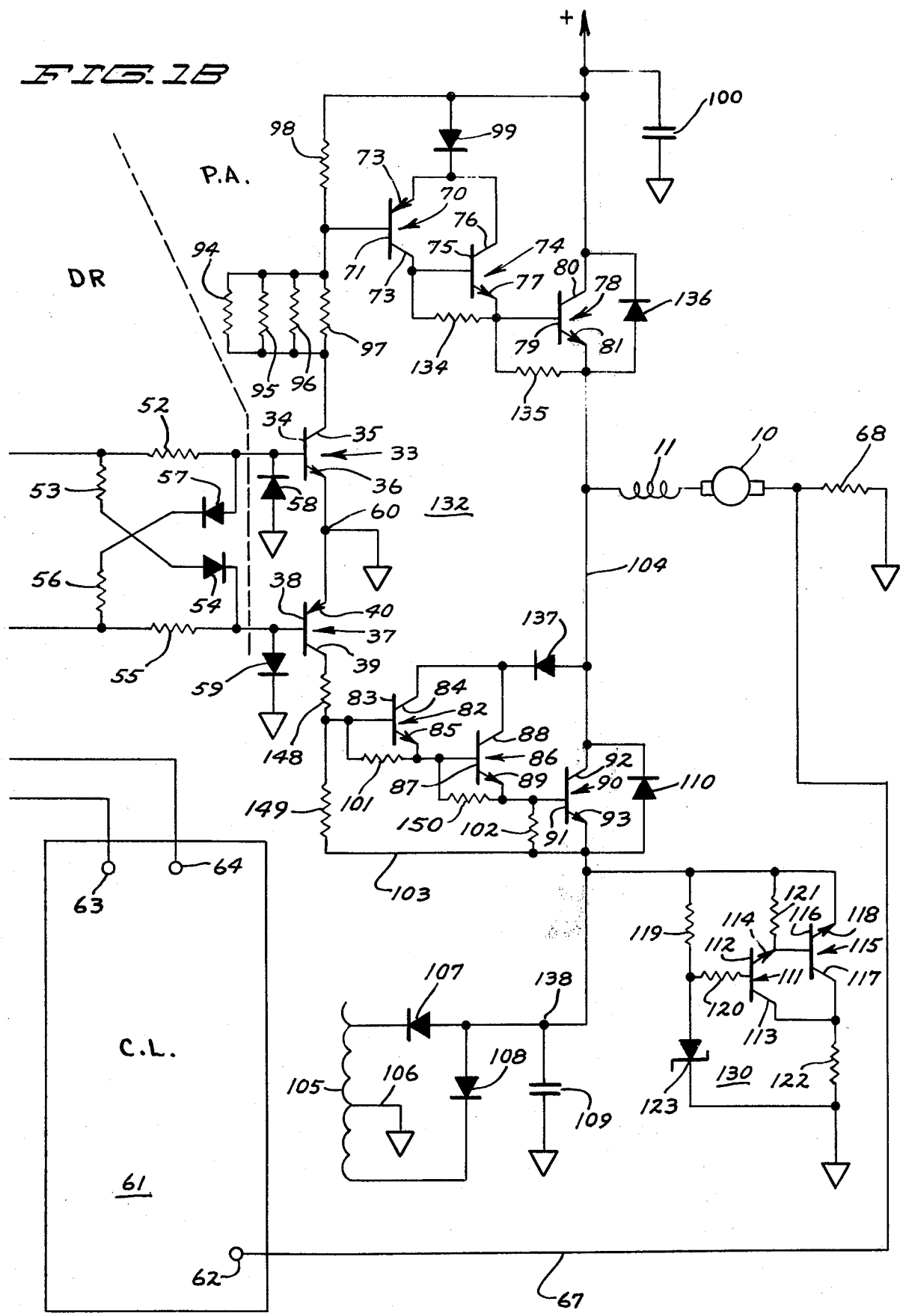

Similarly, transistor 37 is shown having base electrode 38 and emitter electrode 40 connected to ground through terminal 60. Collector electrode 39 on transistor 37 is connected to base electrode 83 on transistor 82 through resistor 148 and to a negative power supply through resistor 149 and conductor 103. Emitter electrode 85 on transistor 82 is connected to base electrode 83 through resistor 101 and collector electrode 84 is connected to conductor 104 through diode 137. Emitter electrode 85 is connected to base electrode 87 on transistor 86 and to base electrode 91 on transistor 90 as well as to the negative power supply through resistor 102 and to base electrode 87 on transistor 86. Base electrode 87 is connected to emitter electrode 89 through resistor 150. Collector 88 on transistor 86 is connected to diode 137. Collector electrode 92 on switching transistor 90 is connected to conductor 104 and emitter electrode 93 is connected to the negative power supply. A free-wheeling diode 110 is connected intermediate collector electrode 92 and emitter electrode 93 on transistor 90.

The negative power supply is shown comprising a transformer secondary winding 105 having a center tap 106 connected to ground and diodes 107 and 108 and includes an energy storage capacitor 109 connected to negative power supply terminal 138.

Voltage regulator 130 is shown connected to negative power supply terminal 138 and includes a transistor 111 and transistor 115. Transistor 111 has a base electrode 112 connected to terminal 138 through resistors 120 and 119 and to ground through zener diode 123. Emitter electrode 114 on transistor 111 is connected to base electrode 116 on transistor 115 and to terminal 138 through resistor 121. Emitter electrode 118 on transistor 115 is connected to terminal 138 and collector electrode 117 on transistor 115 is connected to collector electrode 113 on transistor 111 and to ground through resistor 122.

An inductor 11, motor 10, and current sensing resistor 68 are connected in series intermediate conductor 104 and ground.

The right end of current sensing resistor 68 is connected to current limiter 61 through conductor 67 connected to terminal 62. The output of current limiter 61 appears at terminals 63 and 64. Command amplifier 12 is shown having input terminals 13 and 14 for connection to a command source of signal and various feedback signals as may be desired, respectively, and includes an output terminal 15.

Pulse width modulator 131 is shown comprised of integrated circuits 17, 21, 25 and 29 and is shown in a generalized form. Reference is made to my copending application Ser. No. 556652, filed Mar. 10, 1975 for a detailed consideration of a pulse width modulator of the type here depicted in general form.

Integrated circuit 17 is shown having input terminals 18 and 19 and an output terminal 20. Input terminal 18 is connected to output terminal 15 through resistor 41 and is connected to ground through resistor 42, having capacitor 43 connected in parallel therewith. Integrated circuit 21 includes input terminals 22 and 23 and output terminal 24. Output terminal 20 on integrated circuit 17 is connected to input terminal 22 through resistor 44. Input terminal 22 is connected to output terminal 24 through capacitor 47 and input terminal 23 is connected to ground. Input terminal 19 on integrated circuit 17 is connected to output terminal 24 on integrated circuit 21 through resistor 46 and output terminal 20 on integrated circuit 17 is connected to input terminal 19 through resistor 45 connected to the left end of resistor 46.

Figure 4:
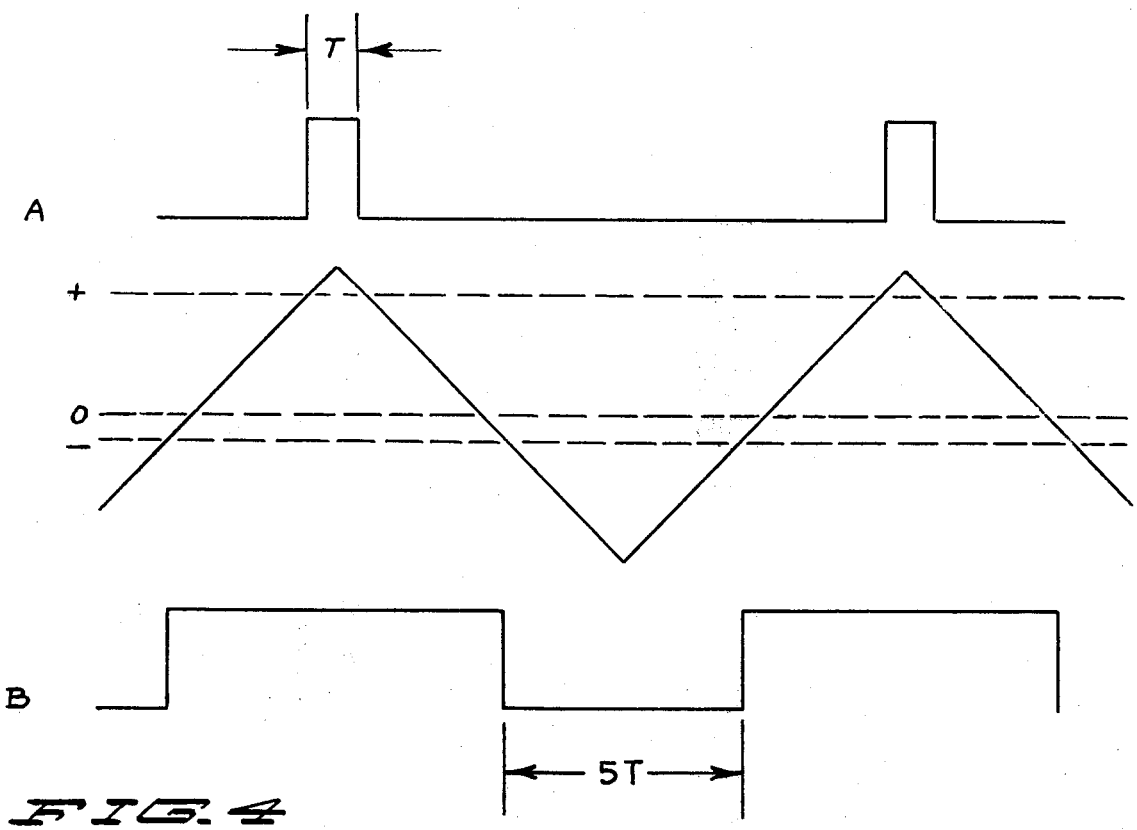
FIG. 4 is a family of curves illustrating the operation of my invention.

Integrated circuits 25 and 29 are connected to function as analog comparators to accept an input as shown on the center curve on FIG. 4 and provide an output illustrated by curves A and B on FIG. 4. Input terminal 26 on integrated circuit 25 is connected to output terminal 24 on integrated circuit 21 through resistor 48 and input terminal 30 on integrated circuit 29 is connected to output terminal 24 through resistor 50. Input terminal 27 on integrated circuit 25 is connected to output terminal 63 on current limiter 61 and input terminal 31 on integrated circuit 29 is connected to output terminal 64 on current limiter 61. The potentials appearing at output terminals 63 and 64 are illustrated by the plus and minus horizontal dotted lines on the top and bottom of the center curve on FIG. 4 and constitute upper and lower biasing trip point levels for the operation of comparators 25 and 29.

Output terminal 28 on integrated circuit 25 is connected to input terminal 26 through resistor 49 and output terminal 32 on integrated circuit 29 is connected to input terminal 30 through resistor 51. Output terminal 28 on comparator 25 is connected to base electrode 34 on transistor 33 through resistor 52 and to ground through diode 58. Output terminal 32 on comparator 29 is connected to base electrode 38 on transistor 37 through resistor 55 and to ground through diode 59. The left end of resistor 52 is connected to the right end of resistor 55 through resistor 53 and diode 54 and the right end of resistor 52 is connected to the left end of resistor 55 through diode 57 and resistor 56.

OPERATION

In the curves of FIG. 4, the system is illustrated as being at rest and for this operation it will be assumed that the ratio of the potentials available at the positive and negative voltage supplies, respectively, is five to one and approximately 150 volts positive and 30 volts negative. At this time the sawtooth wave that is applied to input terminals 26 and 30 on comparators 25 and 29 is symmetrical about its zero axis, as illustrated by the center dotted line on the center curves on FIG. 4. The bias potentials for input terminals 27 and 31 on integrated circuit comparators 25 and 29, respectively, are indicated by the top dotted curve on the center of FIG. 4 and the lower dotted curve on the center of FIG. 4, respectively. As may be seen, the outputs of comparators 25 and 29 then become curve A for comparator 25 and curve B for comparator 29 and consist of time displaced pulses which serve to trigger switching transistors 78 and 90 on in the ratio shown. Since the time T for the positive going pulse on curve A is one-fifth of the time, 5T for the pulse on the negative going curve B, the average potential applied to motor 10 through conductor 11 is equal and opposite because of the five to one ratio in the magnitudes of the potentials of the power supplies.

As the command amplifier causes the sawtooth wave form to be displaced from symmetry about its zero axis, the ratio of the on time to the off time of the two pulse trains varies and the average potential applied to motor 10 changes to cause it to rotate in one direction or the other.

It should be noted at this point that the pulse wave trains of curves A and B on FIG. 4 are separated or displaced, to provide "guard" spacing between the pulses to prevent simultaneous turn-on of transistor switches 78 and 90 to thereby eleiminate the possibility of damage to the system. The "guard" pulses, or deadband, may be adjusted by changing the bias potentials shown as the upper and lower dotted lines on FIG. 4, It may also be noted that with the biases at selected predetermined levels whenever the triangular wave form is modulated by an input signal from command amplifier 12, it will rise above the lower negative bias or drop below the upper positive bias and only one of the switching transistors will be operable.

Assuming that command amplifier 10 presents a positive input command, switching transistor 78 will turn on and off at the fixed pulse width modulation rate at a ratio proportional to the positive input command. When transistor 78 is conductive, current flows from the positive supply through the motor to ground and when transistor 78 is nonconductive, inductance in the circuit causes the motor current to continue to flow in the same direction and current flows from the energy storage capacitor 109 and shunt regulator through the motor to ground. This causes an increasing negative charge on energy storage capacitor 109 which may, under some conditions of operation, become destructive. For this reason, the shunt regulator 130 is provided to prevent build-up of voltage across capacitor 109 above a predetermined negative value.

When the command signal goes negative, transistor 78 will remain nonconductive and transistor 90 will be rendered conductive in accordance with the pulses supplied thereto and current will flow from ground through the motor to energy storage capacitor 109. When transistor 90 is nonconductive, motor current flows in the same direction and through the free-wheeling diode 136 to the positive power supply to charge capacitor 100 and the shunt regulator remains off. Under certain extreme conditions of operation, it may be desirable to provide a shunt regulator to limit the charge accumulating on energy storage capacitor 100. It may also be appreciated that the negative power supply may be eliminated in some cases and replaced by an energy storage capacitor of suitable capacity to supply the power necessary during deceleration and positioning of the shaft of the motor following an acceleration phase of operation.

Figure 5:
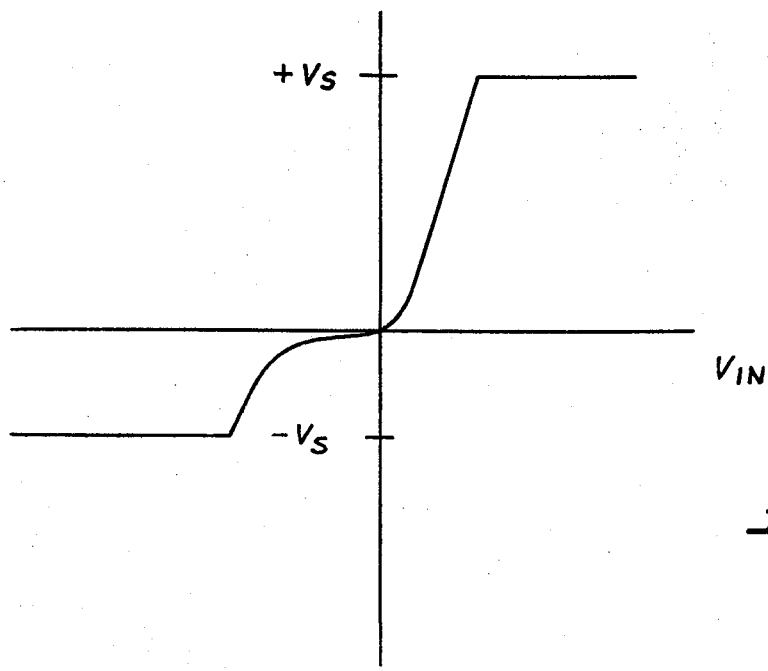
FIG. 5 is a curve illustrating the overall system characteristics.

FIG. 5 illustrates the difference in overall system gain in the positive direction with respect to the negative direction and FIG. 2 illustrates the difference in operation between the asymmetrical operation just described and that obtained where no source of negative potential is available, curve A representing a typical operation with a knee in the curve as the motor decelerates to a zero velocity, and curve B representing the sharp slope available through the use of the negative potential source provided either by the energy storage capacity or the negative power supply.

The operation of current limiter 61 is fully described in the aforementioned copending application and includes means for providing bias potentials which may conveniently be set as illustrated in the center curve on FIG. 4 for a zero command input and which will react to load or motor current through current sensing resistor 68 to provide a dual limiting function through the use of a current sensor and variable gain amplifier which will sense excessive currents in motor 10 to vary the bias applied to input terminals 27 and 31 on comparators 25 and 29 in a manner to reduce the current flowing through motor 10. As described in the aforementioned copending application, an initial period of high current is permitted followed by a period of reduced current as determined by a timing device used to vary the gain of the variable gain amplifier. The output of the variable gain amplifier affects the magnitude of the biasing potential to maintain the desired current flow through motor 10 under conditions of excessive current.

The following is a table of values of components utilized in the preferred embodiment:

| | |
|---|---|
| 11 | 10 mhy Inductor |
| 17 | LM301A Integrated Circuit, Manufacturer National Semiconductor |
| 21 | LM741 Integrated Circuit, Manufacturer National Semiconductor |
| 25 | LM301A Integrated Circuit, Manufacturer National Semiconductor |
| 29 | LM301A Integrated Circuit, Manufacturer National Semiconductor |
| 33 | 2N3440 type Transistor |
| 37 | 2N3645 type Transistor |
| 41 | 5.1K Resistor |
| 42 | 6.2K Resistor |
| 43 | .22 uf Capacitor |
| 44 | 10K Resistor |
| 45 | 12K Resistor |
| 46 | 3K Resistor |
| 47 | .022 uf Capacitor |
| 48 | 1K Resistor |
| 49 | 150K Resistor |
| 50 | 1K Resistor |
| 51 | 150K Resistor |
| 52 | 3.3K Resistor |
| 53 | 2.7K Resistor |
| 54 | IN914 Diode |
| 55 | 1.8K Resistor |
| 56 | 2.7K Resistor |
| 57 | IN914 Diode |
| 58 | IN914 Diode |
| 59 | IN914 Diode |
| 68 | 0.1 ohm Resistor |
| 70 | 2N6424 Transistor |
| 74 | 2N6079 Transistor |
| 78 | 40854 Transistor, RCA |
| 82 | 2N3738 Transistor |
| 86 | 2N6079 Transistor |
| 90 | 40854 Transistor, RCA |
| 94 | 12K Resistor |
| 95 | 12K Resistor |
| 96 | 12K Resistor |
| 97 | 12K Resistor |
| 98 | 100 ohm Resistor |
| 99 | IN4001 Diode |
| 100 | 3000 uf Capacitor |
| 101 | 56 ohm Resistor |
| 102 | 10 ohm Resistor |
| 107 | MR754 Diode, Motorola |
| 108 | MR754 Diode, Motorola |
| 109 | 10,000 uf Capacitor |
| 110 | MR824 Diode, Motorola |
| 111 | TIP29A Transistor, Texas Instruments |
| 115 | 2N3055 Transistor |
| 119 | 1K Resistor |
| 120 | 100 ohm Resistor |
| 121 | 100 Ohm Resistor |
| 122 | 3 ohm Resistor |
| 123 | IN5368 Zener Diode |
| 134 | 47 ohm Resistor |
| 135 | 10 ohm Resistor |
| 136 | MR 824 Diode, Motorola |
| 137 | IN4001 Diode |
| 148 | 270 ohm Resistor |
| 149 | 620 ohm Resistor |
| 150 | 47 ohm Resistor |

Having now therefore fully illustrated and described my invention, what I claim to be new and desire to protect by Letters Patent is:

1. In apparatus of the class above described, the combination comprising;
   a. a source of pulse width modulated signals of opposite polarity and variable width;
   b. load means to be reversibly driven thereby;
   c. first and second current controlling means having input terminals connected to said sources of signal in a complimentary configuration;
   d. a first source of electric current of one polarity;
   e. a second source of electric current of opposite polarity; one of said sources of electric current having a higher potential than the other; and
   f. switching means connected to said current controlling means so that actuation of one current controlling means causes one of said sources of electric current to be connected to energize said load means and actuation of the other of said current controlling means causes the other of said sources to be connected to said load means.

2. The apparatus of claim 1 in which the load means include an inductive impedance.

3. The apparatus of claim 1 in which the load means is a DC motor.

4. The apparatus of claim 3 in which an inductive means is connected in series with the DC motor.

5. The apparatus of claim 1 in which the pulse width modulated signals are of unequal pulse duration.

6. The apparatus of claim 1 in which one of the sources of electric current includes energy storage means and means are provided to conduct energy thereto when the other of the sources of electric current is disconnected from the load means.

7. The apparatus of claim 6 in which one of the switching means includes means for conducting current reversely thereof.

* * * * *